(12) United States Patent
Jensen et al.

(10) Patent No.: US 7,352,450 B2
(45) Date of Patent: Apr. 1, 2008

(54) DETERMINATION OF POLARIZATION DEPENDENT PROPERTIES

(76) Inventors: Thomas Jensen, P.O. Box 7599, Loveland, CO (US) 80537-0599; Martin Wunderling, P.O. Box 7599, Loveland, CO (US) 80537-0599; Ruediger Maestle, P.O. Box 7599, Loveland, CO (US) 80537-0599

( * ) Notice: Subject to any disclaimer, the term of this patent is extended or adjusted under 35 U.S.C. 154(b) by 168 days.

(21) Appl. No.: 11/166,899

(22) Filed: Jun. 24, 2005

(65) Prior Publication Data

US 2006/0038981 A1    Feb. 23, 2006

(30) Foreign Application Priority Data

Aug. 18, 2004   (EP)  .................. 04103970

(51) Int. Cl.
*G01N 21/00* (2006.01)
(52) U.S. Cl. .................................... 356/73.1
(58) Field of Classification Search ............ None
See application file for complete search history.

(56) References Cited

U.S. PATENT DOCUMENTS 6,762,829 B2*  7/2004  Babin et al. ............... 356/73.1
6,888,625 B2*  5/2005  Anderson ................. 356/73.1

FOREIGN PATENT DOCUMENTS

| EP | 0654657 | 5/1995 |
|----|---------|--------|
| EP | 1059543 | 12/2000 |
| EP | 1191320 | 3/2002 |
| EP | 1207377 | 5/2002 |
| EP | 1329702 | 7/2003 |

* cited by examiner

*Primary Examiner*—Tu T. Nguyen

(57) ABSTRACT

The invention relates to determining a polarization dependent property of an optical device under test, wherein a response signal is received from the device under test in response to an optical stimulus signal having an reference state of polarization, an output state of polarization of the response signal is determined, a reference information about the reference state of polarization is received, the reference state of polarization is determined on the base of the reference information and a predefined function describing the dependency of reference information versus the reference state of polarization, and the polarization dependent property is determined on the base of the reference state of polarization and the output state of polarization.

18 Claims, 5 Drawing Sheets

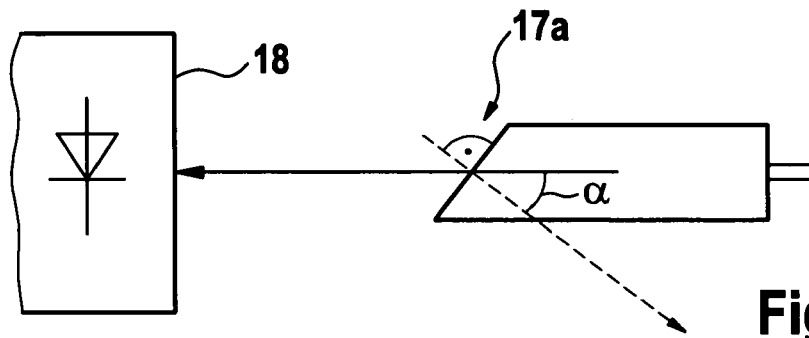
Fig. 3.1
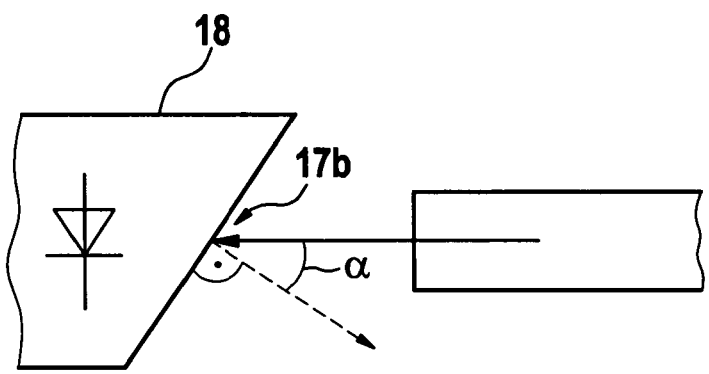
Fig. 3.2
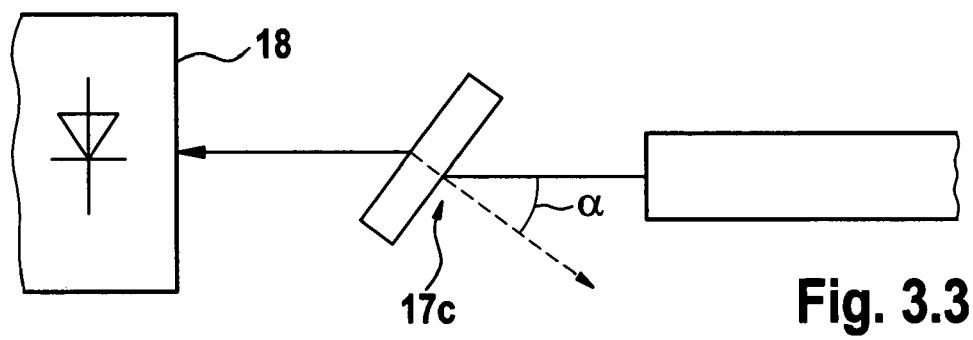
Fig. 3.3
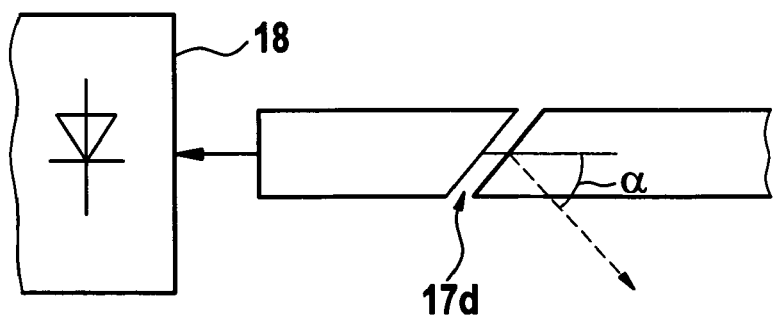
Fig. 3.4

$$E_{LS} = \begin{pmatrix} 1 \\ 0 \end{pmatrix}$$

Fig. 5.1

$$J_{PT}(\delta,\theta) = \begin{pmatrix} \cos(\theta) & \sin(\theta) \\ -\sin(\theta) & \cos(\theta) \end{pmatrix}^T \cdot \begin{pmatrix} \exp\left(i \cdot \frac{\delta}{2}\right) & 0 \\ 0 & \exp\left(-i \cdot \frac{\delta}{2}\right) \end{pmatrix} \begin{pmatrix} \cos(\theta) & \sin(\theta) \\ -\sin(\theta) & \cos(\theta) \end{pmatrix}$$

Fig. 5.2

$$J_{PT}(\delta) = \begin{pmatrix} \cos\left(\frac{1}{2} \cdot \delta\right) & i \cdot \sin\left(\frac{1}{2} \cdot \delta\right) \\ i \cdot \sin\left(\frac{1}{2} \cdot \delta\right) & \cos\left(\frac{1}{2} \cdot \delta\right) \end{pmatrix} \quad \text{for} \quad \theta = 45 \cdot \frac{2\pi}{360}$$

Fig. 5.3

$$J_{PT}(\delta) \cdot E_{LS} = \begin{pmatrix} \cos\left(\frac{1}{2} \cdot \delta\right) \\ i \cdot \sin\left(\frac{1}{2} \cdot \delta\right) \end{pmatrix} = E_{REF}$$

Fig. 5.4

$$J_{PDL} = \begin{pmatrix} q & 0 \\ 0 & r \end{pmatrix}$$

Fig. 5.5

$$J_{PDL} \cdot E_{REF} = \begin{pmatrix} q \cdot \cos\left(\frac{1}{2} \cdot \delta\right) \\ i \cdot r \cdot \sin\left(\frac{1}{2} \cdot \delta\right) \end{pmatrix} = E_D$$

Fig. 5.6

$$P = E_D \cdot E_D^* = q^2 \cdot \cos\left(\frac{1}{2} \cdot \delta\right)^2 + r^2 \cdot \sin\left(\frac{1}{2} \cdot \delta\right)^2$$

Fig. 5.7

Fig. 5.8
q := 1    r := 0.5
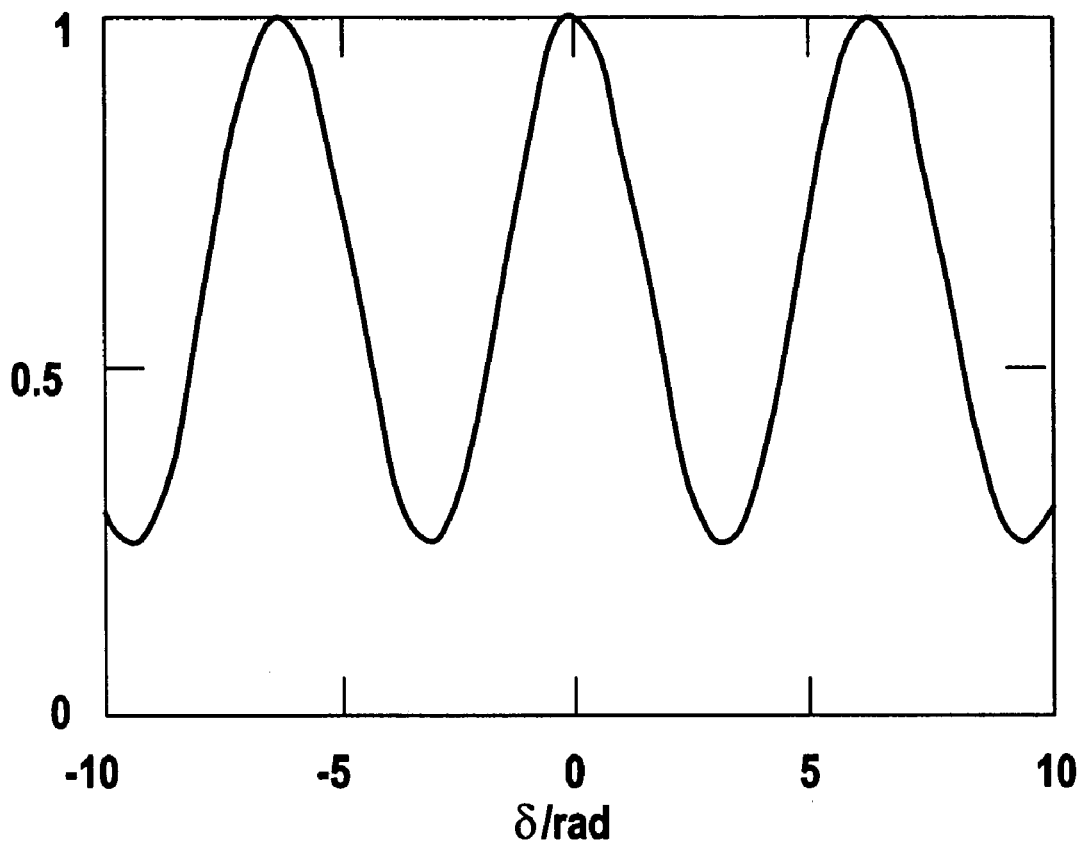
Fig. 5.9
$$E_{out}(ex1, ey1, \varphi) := \begin{pmatrix} ex1 \cdot \exp(-i \cdot \varphi) \\ ey1 \end{pmatrix}$$
Fig. 5.10
$$E_{out} = J_{DUT} \cdot E_{REF} = \begin{pmatrix} J11 & J12 \\ J21 & J22 \end{pmatrix} E_{REF}$$

DETERMINATION OF POLARIZATION DEPENDENT PROPERTIES

BACKGROUND ART

The present invention relates to a determination of polarization dependent properties of an optical device under test—DUT.

Determining polarization dependent parameters like polarization dependent loss (PDL) and polarization dependent group delay PDGD, covering both the Differential Group Delay DGD and the Polarization Mode Dispersion PMD, is of high importance for advanced optical communication systems.

Today's solutions for determining a polarization behavior of a device under test, e.g. polarization dependent loss parameters, comprise scrambling methods, i.e. applying a random variation of polarization states and comparing maximum with minimum loss determined from the signal responses, and analytic methods like the so-called Mueller method. Within the Mueller method, a device under test, e.g. a transmission fiber, is stimulated with 4 defined polarization states, and the optical power of the corresponding input signals applied to the DUT and the output signals received from the DUT are measured and analyzed together. This method is described in more details in 'Fiber Optic Test and Measurement' by Dennis Derickson, ISBN 0-13-534330-5, 1998, pages 354-358.

U.S. Pat. No. 6,671,038 discloses a method of measuring polarization dependent parameters of a DUT in dependence of the wavelength, wherein a polarization translator is connected between a tunable light source and the DUT. When sweeping the wavelength of the light source, the polarization translator provides to the DUT a signal wherein the polarization is periodically changing over the wavelength. In each wavelength range, a plurality of different polarization states are provided to the DUT, thus allowing a determination of polarization depended parameters by detecting the corresponding power values returning from the DUT.

DISCLOSURE OF THE INVENTION

It is an object of the invention to provide an improved determination of a polarization behavior of an optical device under test. The object is solved by the independent claims. Preferred embodiments are shown by the dependent claims.

For obtaining a high accuracy polarization behavior of a DUT, it is important to know the state of polarization of the stimulus signal provided to the DUT. Therefore, according to an embodiment of the invention, a response signal is received from the device under test in response to an optical stimulus signal that has a determined input (reference) state of polarization. The corresponding output state of polarization of the response signal (R) is measured and reference information about the input state of polarization is analyzed. For determining the polarization dependent property of the DUT, the input state of polarization and the output state of polarization are combined.

Therewith it is possible to synchronize the input and the output measurements. Thus, variations of the birefringence of the transmitter or the optical connection to the DUT due e.g. to temperature changes or aging that result in variations of polarization of the stimulus signal can be easily detected and taken into account.

In a further embodiment, a polarization dependent loss device is provided receiving at least a fraction of the optical stimulus signal. The optical power of a passing signal part and thus of a reflecting signal part of the incident optical power varies with the input state of polarization. A detector receiving either the passing signal part or the reflecting signal part generates reference information corresponding to the detected optical power.

In a further embodiment, the input state of polarization of the optical stimulus signal is determined on the base of the reference information and a known function describing the dependency of the optical power loss of the polarization dependent loss device versus the reference state of polarization of the optical stimulus signal.

In a further embodiment, the optical stimulus signal is divided onto a first path comprising the device under test and a second path comprising an optical detector. A polarization dependent loss device is either provided in the first optical path or the second optical path. The optical power loss of the polarization dependent loss device is a known function of the polarization of the optical stimulus signal. The remote receiver receives a response signal provided by the device under test in response to the optical stimulus signal and a reference signal with information about the power loss of the polarization dependent loss device detected by the optical detector. The receiver determines the state of polarization of the stimulus signal and the state of polarization of polarization dependent property.

A plurality of measurements may be performed at different reference polarization states. The polarization dependent property of the device under test is then determined on the base of the plurality of measurements.

In an embodiment, the polarization dependent property comprises four parameters as elements of a 2×2 Jones matrix. Two measurements are performed for obtaining two different pairs of reference and output states of polarization (each vectors of the dimension 2). Thus, four independent equations with said four parameters are derived from said pairs of reference and output states of polarization.

For generating the stimulus signal, a narrowband input light is emitted into a polarization translator, of which the wavelength is swept over the time. The polarization translator translates the state of polarization of the input light reference state of polarization depending on the wavelength of the input light. The polarization translator can be: a polarization maintaining fiber, a birefringent plate and any other element with different path lengths for different input states of polarization.

If the laser light is linear polarized and emitted into the polarization translator under an angle of 45 degree relative to the polarization main axes, the reference state of polarization basically follows a great circle of the Poincare Sphere hitting both poles, when varying the wavelength.

In a further embodiment, the polarization dependent property is determined in dependence of the wavelength of the stimulus signal. Therefore, different measurements of the polarization dependent parameter are carried out for each of subsequent wavelength ranges. The properties of the polarization translator are preferably chosen such that within one wavelength range the polarization dependent property of the device under test is substantially constant.

In a further embodiment, the wavelength of the stimulus signal is additionally measured and corresponding information is passed to the receiver.

In a further embodiment, the optical power of the stimulus signal is additionally measured and corresponding information is passed to the receiver.

The polarization dependent property of the device under test can be polarization dependent loss, polarization dependent group delay, differential group delay, or polarization mode dispersion.

The invention can be partly or entirely embodied or supported by one or more suitable software programs, which can be stored on or otherwise provided by any kind of data carrier, and which might be executed in or by any suitable data processing unit. Software programs or routines can be run in the transmitter, e.g. for generating the reference information to be sent to the receiver and/or in the receiver for determining values of the input states of polarization and the output states of polarization and calculating the polarization dependent behavior on the base of these values.

BRIEF DESCRIPTION OF DRAWINGS

Other objects and many of the attendant advantages of embodiments of the present invention will be readily appreciated and become better understood by reference to the following more detailed description of preferred embodiments in connection with the accompanied drawings. Features that are substantially or functionally equal or similar will be referred to with the same reference signs.

FIG. 1 shows an exemplary polarization-mode dispersion (PMD) test setup with a transmitter 1, a device under test (DUT) 2 and a receiver 3. Transmitter 1 emits an optical stimulus signal S over an optical fiber connection into DUT 2. DUT 2 transmits a response signal R over a further optical fiber connection into receiver 3. Further, transmitter 1 transmits a reference signal REF to receiver 3.

Stimulus signal S is a narrowband optical signal. For determining the polarization dependent behavior of DUT 2, the response from DUT 2 is analyzed for a plurality of different input polarization states of stimulus signal S, in the following also referred to as measuring points (each measurement point is defined by the wavelength and the polarization state of stimulus signal S).

Accurate measurements of the polarization dependent behavior of DUT 2 require a detailed knowledge of the in-coupled polarization wave emitted by transmitter 1. For instance in cases of temperature variations any birefringence of transmitter 1 or the optical connection to DUT 2 might vary accordingly and hence the rotation of stimulus signal S changes. Therefore, the state of polarization of the stimulus signal S is determined at transmitters side and a corresponding reference information REF information is transmitted to receiver 3.

The reference information REF can be transmitted over a separate line (e.g. an electrical line or an RF wireless connection) to receiver 3 or as optical signal over DUT 2 using the fiber connections for stimulus signal S and response signal R.

Receiver 3 determines the polarization dependent behavior of DUT 2 by measuring a state of polarization of response signal R, receiving a corresponding reference information and relating the measured information with the reference information. For measuring the state of polarization of response signal R, receiver 3 comprises a polarization analyzer, further also referred to as polarimeter, for determining the state of polarization of response signal R.

Polarimeters are well known in the art. In a possible realization, a polarimeter comprises an optical splitter splitting an incident light to be analyzed into four optical branches, wherein a first branch comprises a polarizer with a first direction, a second branch comprises a polarizer with a second direction perpendicular to the first direction, a third branch comprises a birefringent wave plate ($\lambda/4$ wave plate) and a polarizer and a fourth branch that is substantially transparent for the incident light. At the end of each branch, a detector is comprised for determining the optical power and generating corresponding electrical signals. The electrical signals are converted into digital values and fed to a control unit that performs an algorithm for determining the state of polarization.

In a preferred embodiment of the invention, DUT responses of at least two measurement points are analyzed together for determining the polarization properties of DUT 2, consisting of four parameters further explained below. The states of polarization are preferably chosen to be significantly different. As measurement result, a set of four independent equations is obtained to determine the four parameters.

Figure 1:
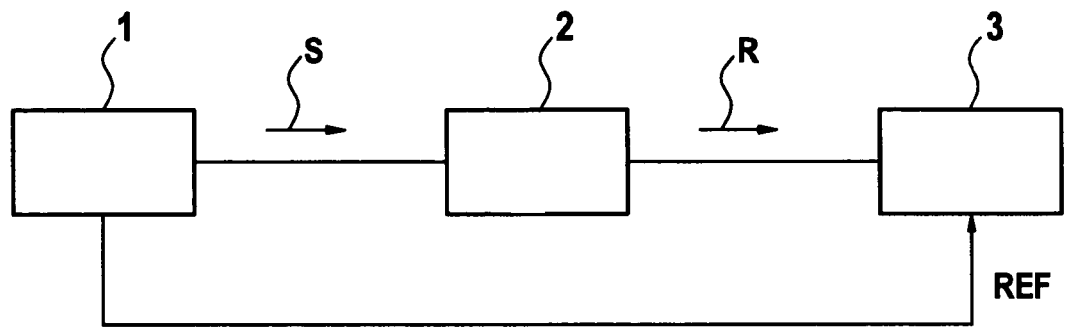
FIG. 1 shows an exemplary PMD test setup according to the invention with a transmitter according to the invention.
Figure 2:
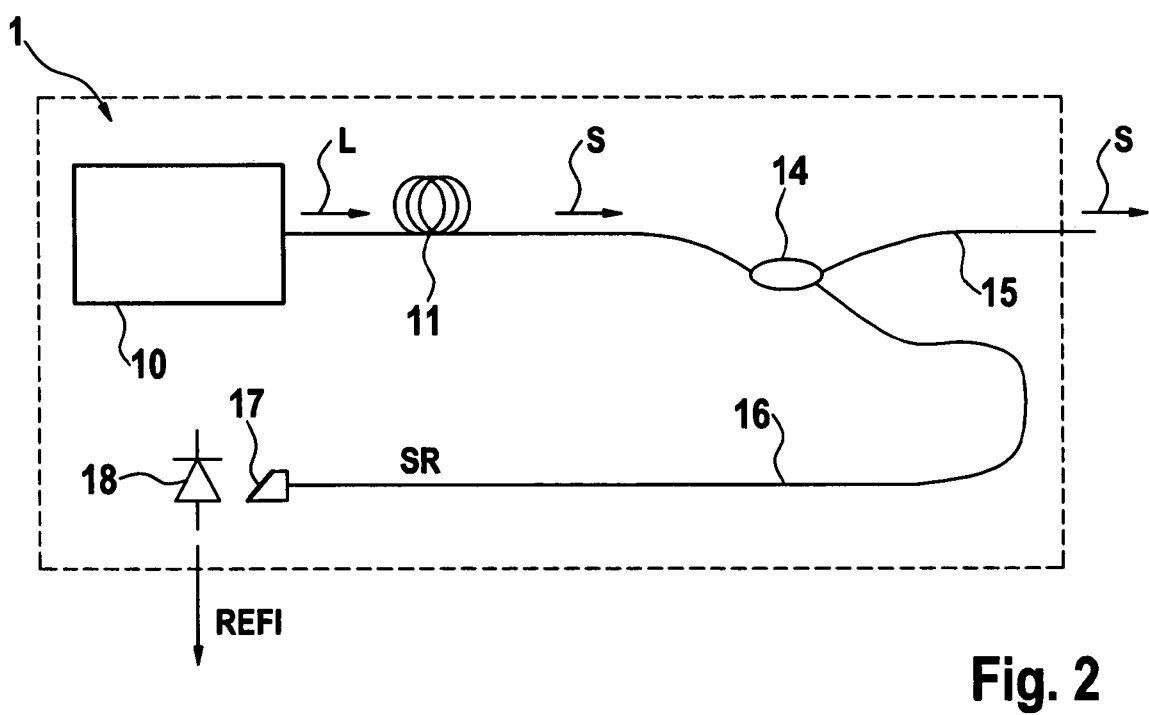
FIG. 2 shows an exemplary block diagram of the transmitter, FIGS. 3.1-3.4 show four exemplary embodiments of a polarization dependent loss device of the transmitter.

Up to here, it was assumed that the polarization characteristics are determined for one fixed wavelength of stimulus signal S. However, it is often of significant interest to obtain a polarization behavior of DUT 2 over a wide range of the wavelength of stimulus signal S. It is therefore possible to define a plurality of consecutive wavelength ranges and to perform for each wavelength range the above-described measurements by setting different states of polarization. In the following, an alternative method of uniquely varying the wavelength and the polarization state will be described. Therefore, a more detailed block diagram of transmitter 1 is shown in FIG. 2.

Transmitter 1 comprises a tunable laser source 10, a polarization translator 11, an optical coupler 14, an output connector 19 for coupling transmitter 1 to DUT2, a polarization dependent loss (PDL) device 17, and a detector 18.

Tunable laser (source) 10 emits a narrowband linear polarized optical light or input light L under determined angle into polarization translator 11. Polarization translator 11 is by way of example a polarization maintaining fiber (PMF) of about 200 m length. A polarization state of the optical signal applied to the polarization translator 11 will be transformed into polarization state dependent on the wavelength $\lambda$ of the optical signal. In a preferred embodiment, input light L is transmitted under a 45° angle into polarization translator 11 so that the polarization states of stimulus signal S are substantially located on a great circle on the Poincare Sphere hitting both poles. However, any defined trajectory on the Poincare Sphere will work as well.

The PMF is connected or spliced to optical coupler 14 (e.g. a one-arm terminated 2×2 coupler) that is further connected over optical fibers 15 and 16 to output connector 19 and to PDL device 17 respectively. The most part of stimulus signal S1 is thus guided to output connector 19, whereas a small part of stimulus signal S1 (preferably 1-5%) is guided to PDL device 17. The PDL device 17, connected between optical coupler 14 and detector 18 causes a power loss of the optical signal transferred to detector 18 depending on the polarization state stimulus signal S. Thus, a modulation of the received signal depending on the wavelength is performed.

Tunable laser 10 preferably sweeps the wavelength periodically from a minimum wavelength to a maximum wavelength. As example, one sweep speed might be about 2 second and the wavelength range might cover around 100 nanometers (nm) between 1520 nm and 1620 nm. When sweeping tunable laser 10, polarization translator 11 changes the polarization of stimulus signal S in dependence of the wavelength, so that different polarization states are provided to DUT 2 with a periodicity corresponding to the sweep periodicity. As example, the Poincare sphere is surrounded around 3000 times. In each surrounding a plurality of pairs of measuring points, e.g. in a distance about 3 to 5 pm are taken.

The polarization translator 11 creates a phase difference dependent on the wavelength between the propagating modes by its birefringence. It can be implemented in several ways. Instead of polarization maintaining fiber (PMF) a waveplate (which shows purely linear birefringence) or any other device with different optical path lengths for different SOPs can be used as polarization translator 11. Further examples of polarization translators can be derived from FIG. 3 and FIG. 4 of U.S. Pat. No. 6,671,038.

PDL device 17 emits an optical beam depending on the polarization of the incident beam, thus having a polarization dependent loss. In the following, different embodiments of PDL devices of transmitter 1 are shown.

FIG. 3.1 shows a first exemplary embodiment of PDL device 17 formed by a waveguide with an inclined end 17a under an inclination angle α. A first part (draft arrow) is emitted to detector 18 and a second part (dotted arrow) is reflected back perpendicular to the end surface. The optical power of the reflected part and consequently the optical power of the transmitted part are depending on the inclination angle α and the actual state of polarization.

FIG. 3.2 shows a second equivalent embodiment of PDL device 17, wherein the waveguide end (or fiber end) is perpendicular to the propagation axis and instead detector 18 shows an inclined surface 18b.

FIG. 3.3 shows a third equivalent embodiment of PDL device 17, wherein the waveguide end (or fiber end) and the detector surface are perpendicular to the propagation axis. An optical block 17c (e.g. a glass plate) is positioned in the optical path between PDL device 17 and detector 18 under inclination angle α.

FIG. 3.4 shows a fourth embodiment of PDL device 17, wherein a waveguide has an inclined cleave 17d.

Alternatively to provide PDL device 17 between optical coupler 14 and optical detector 18, it may be located between polarization translator 11 and optical coupler 14.

Figure 4:
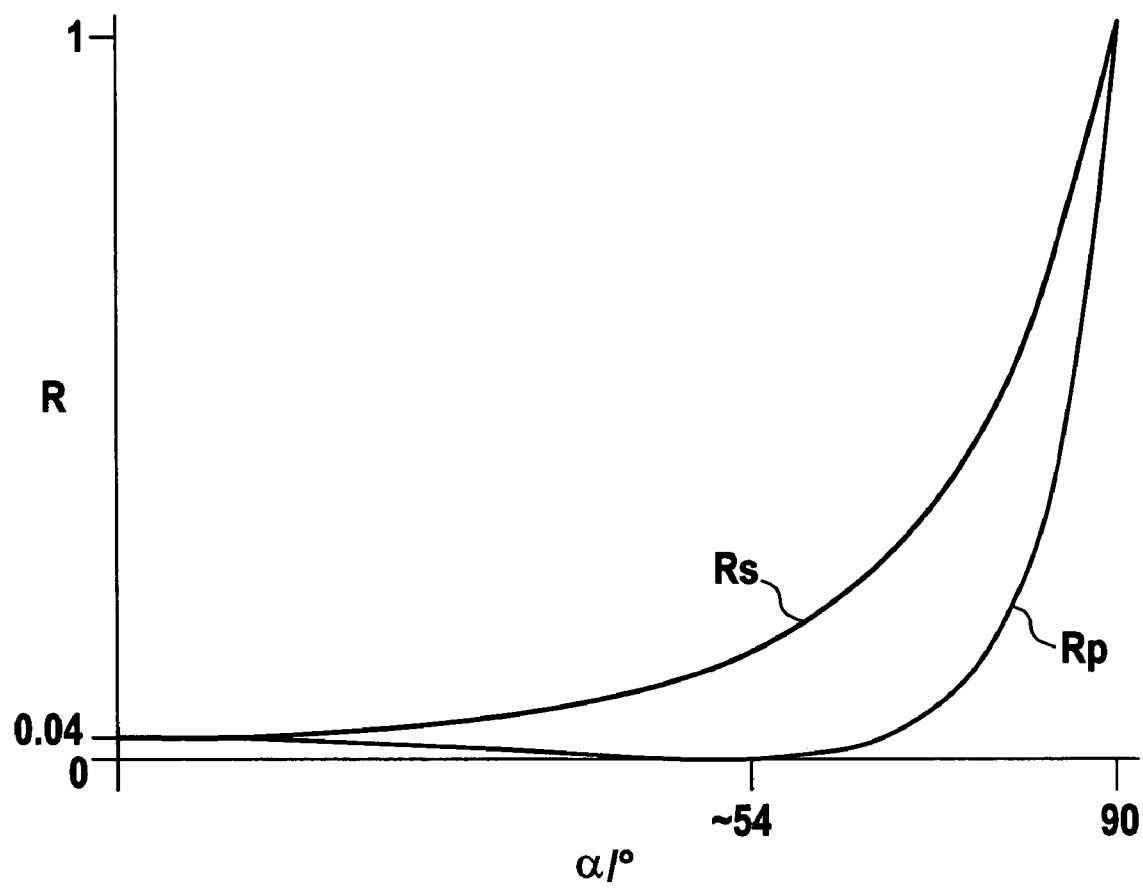
FIG. 4 shows a diagram with reflectivity curves, and FIGS. 5.1-5.10 show a set of equations and a corresponding diagram for mathematically illustrating a method according to the invention.

FIG. 4 shows the reflectivity for parallel (p) and perpendicular (s) polarized light and their dependencies from the inclination angle α for an air-glass transition. For small inclination angles α (here: smaller than about 5°), the reflectivity of parallel (Rp) and perpendicular (Rs) polarized light is substantially equal and is quite low (0.04) The reflectivity of the perpendicular light continuously increases with increasing inclination angle α, whereas the reflectivity of the parallel polarized light first decreases with increasing inclination angle α up to 54 degree and further increase significantly up to 90 degree. The difference between parallel and perpendicular polarized light shows high values for angles α between roughly 45 and 85 degree.

FIG. 5.1-5.10 show a set of equations or diagrams for mathematically illustration a method according to the invention.

In FIG. 5.1 field intensity ELS of the input light L, further referred to as input light field ELS, is, by way of example, linear polarized in one main axis (x-axis). FIG. 5.2 shows an exemplary general Jones Matrix JPD (δ,θ) depending on the parameters δ (phase difference depending on the wavelength λ of laser light E) and θ (incident angle in relation to the polarization main axes of polarization translator 11). FIG. 5.3 the Jones Matrix JPD (δ) of FIG. 5.3 for a special case of θ=45 degree (45*2π/360 in radiant). FIG. 5.4 shows the field intensity EREF of stimulus signal S, further referred to as reference signal field or reference state of polarization EREF depending on the phase difference δ that is obtained by a multiplication of Jones Matrix JPD (δ) with input light field ELS. FIG. 5.5 shows a general Jones matrix JPL (q, r) of PDL loss device 11 with two characterizing parameters q and r that are assumed to be well known. FIG. 5.6 shows the field intensity of an optical signal incident on optical detector 18. FIG. 5.7 describes the optical power P detected by optical detector 18.

FIG. 5.8 shows a graphical representation of the detected power P for the exemplary values of q=1 and r=0.5. Depending on the phase difference δ, the power periodically varies between 1 and roughly 0.3. The amplitude e.g. depends on the choice of the material of PDL device 17 and on the inclination angle α described in FIGS. 3.1-3.4 and FIG. 4. From the detected optical power, the phase difference δ and therewith the reference light field EREF can be determined. FIG. 5.9 shows a general formula of an output state of polarization EOUT with the parameters ex1 (linear polarization in x-direction), ey1 (linear polarization in y-direction) and φ (indicating a phase difference between ex1 and ey1) that is measured by a polarization analyzer as described above. FIG. 5.10 shows an equation system (notated in matrix form) linking together the reference light field EREF, the output light field EOUT and a Jones Matrix with four parameters (J11, J12, J21, J22) describing the polarization dependent loss of DUT 2, further referred to as DUT Jones Matrix JDUT. One equation system represents two equations. For unambiguously determining the DUT Jones Matrix, two measurements with different input light fields (have to be carried out. As tunable laser source varies the wavelength of input light L, the measurements are taken in certain time intervals so that the state of polarization is significantly different, but the wavelength difference is so small that the DUT behavior can be regarded as constant. [bitte wording genau überprüfen].

In order to determine the differential group delay DGD at receivers' side, the wavelength of the input light might be directly determined by a wavelength measurement device behind tunable laser 10. The measured wavelength can be additionally transmitted in the reference information to receiver 3.

Further it is possible to measure optical power of input light L at the output of tunable laser 10 and to transmit this information additionally to receiver 3 to accurately determine loss properties of the DUT.

The invention claimed is:

1. A method of determining a polarization dependent property of an optical device under test, comprising:
   receiving a response signal from the device under test in response to an optical stimulus signal having a reference state of polarization,
   determining an output state of polarization of the response signal,
   receiving a reference information about the reference state of polarization,
   determining the reference state of polarization by relating the received reference information to a predefined function describing the dependency of reference information versus the reference state of polarization, and determining the polarization dependent property on the base of the reference state of polarization and the output state of polarization.

2. The method of claim 1, wherein a polarization dependent loss device receives at least a fraction of the optical stimulus signal and generates an optical signal with an optical power loss depending on the reference state of polarization and wherein the reference information comprises an information about said optical power loss.

3. The method of claim 2, wherein the predefined function is describing the dependency of the optical power loss of the polarization dependent loss device versus the reference state of polarization of the optical stimulus signal.

4. The method of claim 2, wherein the optical stimulus signal is split into a first path comprising the device under test and a second path comprising the polarization dependent loss device and a detector.

5. The method of claim 4, wherein the polarization dependent property is determined in dependence of the wavelength of the stimulus signal and wherein different measurements of the polarization dependent parameter are carried out for each of subsequent wavelength ranges.

6. The method of claim 5, wherein the properties of a polarization translator are chosen such that within one wavelength range the polarization dependent property of the device under test is substantially constant.

7. The method of claim 2, wherein the optical stimulus signal is split into a first path comprising the device under test and the polarization dependent loss device and a second path comprising a detector.

8. The method of claim 1, wherein a plurality of measurements is performed at different reference polarization states and wherein the polarization dependent property of the device under test is determined on the base of the plurality of measurements.

9. The method of claim 8, wherein the polarization dependent property comprises four parameters, wherein two measurements are performed for obtaining two different pairs of reference and output states of polarization and wherein four independent equations with said four parameters are derived from said pairs of reference and output states of polarization.

10. The method of claim 8, wherein for generating the stimulus signal a narrowband input light is emitted into a polarization translator, wherein the wavelength of the input light is varied over the time and wherein the polarization translator translates the state of polarization of the input light reference state of polarization depending on the wavelength of the input light.

11. The method of claim 10, wherein the laser light is linear polarized and emitted into the polarization translator under an angle of 45 degree relative to the polarization main axes, so that the reference state of polarization basically follows a great circle of the Poincare Sphere hitting both poles, when varying the wavelength.

12. The method of claim 10, wherein the polarization translator is one of: a polarization maintaining fiber, a birefringent plate and any other element with different path lengths for different input states of polarization.

13. The method of claim 1, wherein, the wavelength of the stimulus signal is measured and wherein the reference information further comprises corresponding wavelength information.

14. The method of claim 1, wherein, the power of the stimulus signal is measured and wherein the reference information further comprises corresponding power information.

15. The method of claim 1, wherein the polarization dependent property is one of polarization dependent loss, polarization dependent group delay, differential group delay, or polarization mode dispersion.

16. An optical receiver for determining a polarization dependent property of an optical device under test that is provided with an optical stimulus signal comprising:
a first receiver adapted for receiving a response signal from the device under test in response to an optical stimulus signal having a reference state of polarization,
a polarization evaluator adapted for determining an output state of polarization of the response signal,
a second receiver adapted for receiving a reference information about the reference state of polarization, and
an optical property evaluator adapted for determining the polarization dependent property on the base of the reference information, a predefined function describing the dependency of reference information versus the reference state of polarization, and the output state of polarization.

17. An optical transmitter for providing a device under test with an optical stimulus signal for determining a polarization dependent property of an optical device under test comprising:
a light source adapted for generating an optical stimulus signal having a reference state of polarization, and
a signal generator adapted for generating a reference information comprising an information about the reference state of polarization according to a predefined function describing the dependency of reference information versus the reference state of polarization.

18. A system for determining a polarization dependent property of an optical device under test, comprising:
an optical transmitter of claim 16 and
an optical receiver of claim 17.

* * * * *